United States Patent
Gailloux et al.

(10) Patent No.: US 7,925,304 B1
(45) Date of Patent: Apr. 12, 2011

(54) AUDIO MANIPULATION SYSTEMS AND METHODS

(75) Inventors: Michael A. Gailloux, Overland Park, KS (US); Robin Katzer, Olathe, KS (US); Carl Persson, Olathe, KS (US)

(73) Assignee: Sprint Communications Company L.P., Overland, KS (US)

( * ) Notice: Subject to any disclaimer, the term of this patent is extended or adjusted under 35 U.S.C. 154(b) by 596 days.

(21) Appl. No.: 11/621,562

(22) Filed: Jan. 10, 2007

(51) Int. Cl.
*H04B 1/38* (2006.01)

(52) U.S. Cl. ............ 455/563; 455/418; 455/414.1; 455/3.06; 379/88.16; 704/258

(58) Field of Classification Search ........... 455/418, 455/414.4, 221, 563, 414, 1, 3.06; 704/258–270; 379/88.16, 88.18, 88.26
See application file for complete search history.

(56) References Cited

U.S. PATENT DOCUMENTS

| | | | |
|---|---|---|---|
| 5,195,090 A * | 3/1993 | Bolliger et al. | 370/314 |
| 6,611,684 B1 * | 8/2003 | Franks | 455/433 |
| 7,003,462 B2 * | 2/2006 | Shambaugh et al. | 704/270 |
| 7,206,388 B2 * | 4/2007 | Diacakis | 379/88.03 |
| 7,401,021 B2 * | 7/2008 | Choi | 704/269 |
| 2003/0028380 A1 * | 2/2003 | Freeland et al. | 704/260 |
| 2004/0138879 A1 * | 7/2004 | Kim | 704/219 |
| 2005/0014487 A1 * | 1/2005 | Kobayashi et al. | 455/412.1 |

* cited by examiner

*Primary Examiner* — Kamran Afshar
*Assistant Examiner* — Vladimir Magloire

(57) ABSTRACT

An audio manipulation method is provided. A call associated with a mobile device is received. Whether an audio manipulation flag is set for the mobile device is determined. An audio signal from the mobile device is manipulated based on an audio manipulation selection in response to a determination that the audio manipulation flag is set for the mobile device. The manipulated audio signal is routed to a receiver communicating with the mobile device.

20 Claims, 5 Drawing Sheets

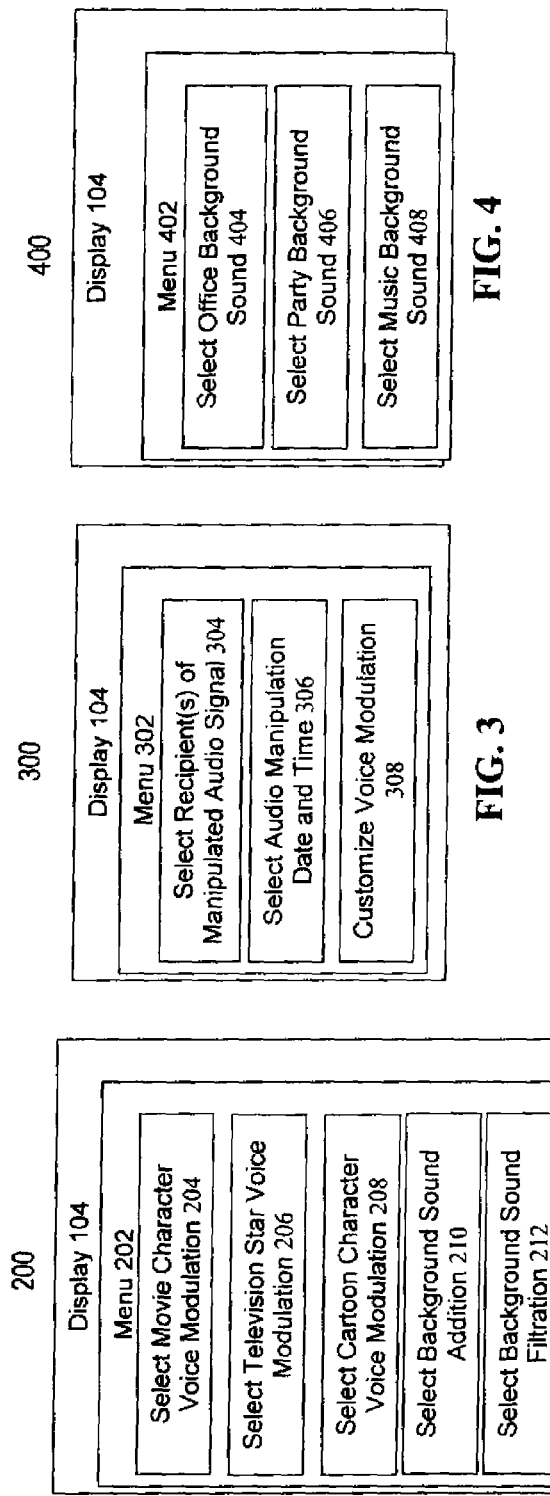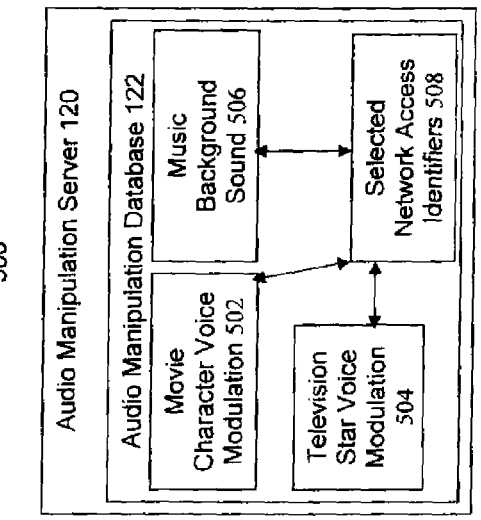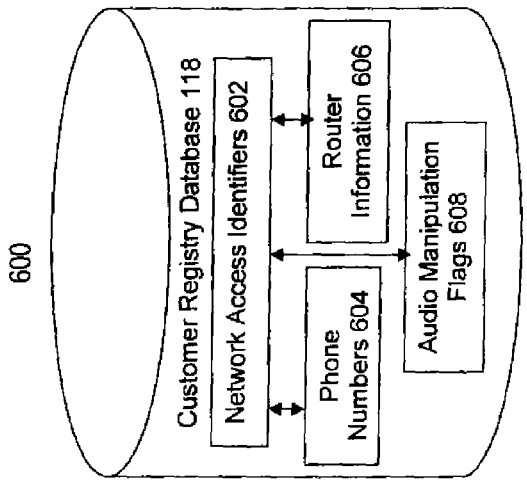

AUDIO MANIPULATION SYSTEMS AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Audio manipulation systems and methods enable a user to manipulate the way their voice or the background sounds behind their voice sounds to listeners. Audio manipulation includes voice modulation, which converts acoustic signals from one form to another, thereby providing the capability for a device user to modify the sound of his voice to a listener on the other end of a voice call. For example, a car salesman can use voice modulation to have his voice sound like the voice of a television star who advertises a car sold by the salesman. However, software required for audio manipulation can be very expensive for most device users. Additionally, equipment required to use audio manipulation with a device, such as a mobile phone, can be bulky. People often forget to take the required audio manipulation equipment with their mobile phone. Some audio manipulation services limit device users to the option of choosing from relatively few voices. Device users may have to make additional purchases for the capability to select from additional voices as new voices become popular.

The above described situation presents unique problems that are not adequately addressed by existing audio manipulation systems.

SUMMARY

Accordingly, various audio manipulation systems and methods are disclosed herein. In some method embodiments, a user's audio manipulation selection is processed by an audio manipulation service. Thereafter, received calls are processed to determine if they are associated with the mobile device. In response to a determination that the received call is associated with the mobile device, the audio manipulation service is engaged to manipulate an audio signal from the mobile device based on the user's audio manipulation selection. The manipulated audio signal is routed to a receiver communicating with the mobile device.

Some audio manipulation system embodiments include a mobile device, a gateway server, and an audio manipulation server. The gateway server receives a call associated with the mobile device, determines whether an audio manipulation flag is set for the mobile device, and engages the audio manipulation server if the flag is set. The audio manipulation server manipulates an audio signal from the mobile device based on an audio manipulation selection, and routes the manipulated audio signal to a receiver communicating with the mobile device.

In some other method embodiments, an audio manipulation service application is executed on a mobile device. An audio manipulation selection is made on the mobile device, setting an audio manipulation flag. A receiver is communicated with by a manipulated audio signal from the mobile device while the audio manipulation flag is set.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 shows an illustrative mobile device display according to some embodiments of the present disclosure.

FIG. 3 shows another illustrative mobile device display according to some embodiments of the present disclosure.

FIG. 4 shows yet another illustrative mobile device display according to some embodiments of the present disclosure.

FIG. 5 shows an illustrative audio manipulation database according to some embodiments of the present disclosure.

FIG. 6 shows an illustrative customer registry database according to some embodiments of the present disclosure.

DETAILED DESCRIPTION

It should be understood at the outset that although specific implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Various methods and systems of audio manipulation are provided. In some system embodiments, a mobile device user makes an audio manipulation selection on a mobile device, such as a mobile phone. Because the user needs only a mobile phone and an audio manipulation service application on the mobile phone for audio manipulation, the user has no external equipment that can be lost or broken. An audio manipulation database stores the audio manipulation selection, and can offer a virtually unlimited number of audio manipulations, such as voice modulations, for selection by each mobile phone user. Some embodiments enable a mobile phone user to manipulate their audio by filtering the background sounds behind their voice, such as noise at a party, or adding background sounds behind their voice, such as dramatic music. Due to the economy of scale, an audio manipulation service can offer audio manipulation to users at inexpensive prices, and serves as a selling point for telecom service providers. If a gateway server determines that a call is associated with a mobile device selected for audio manipulation, an audio manipulation server manipulates an audio signal from the mobile device based on the previous audio manipulation selection. Then the audio manipulation server routes the manipulated audio signal to a receiver communicating with the mobile device.

Figure 1:
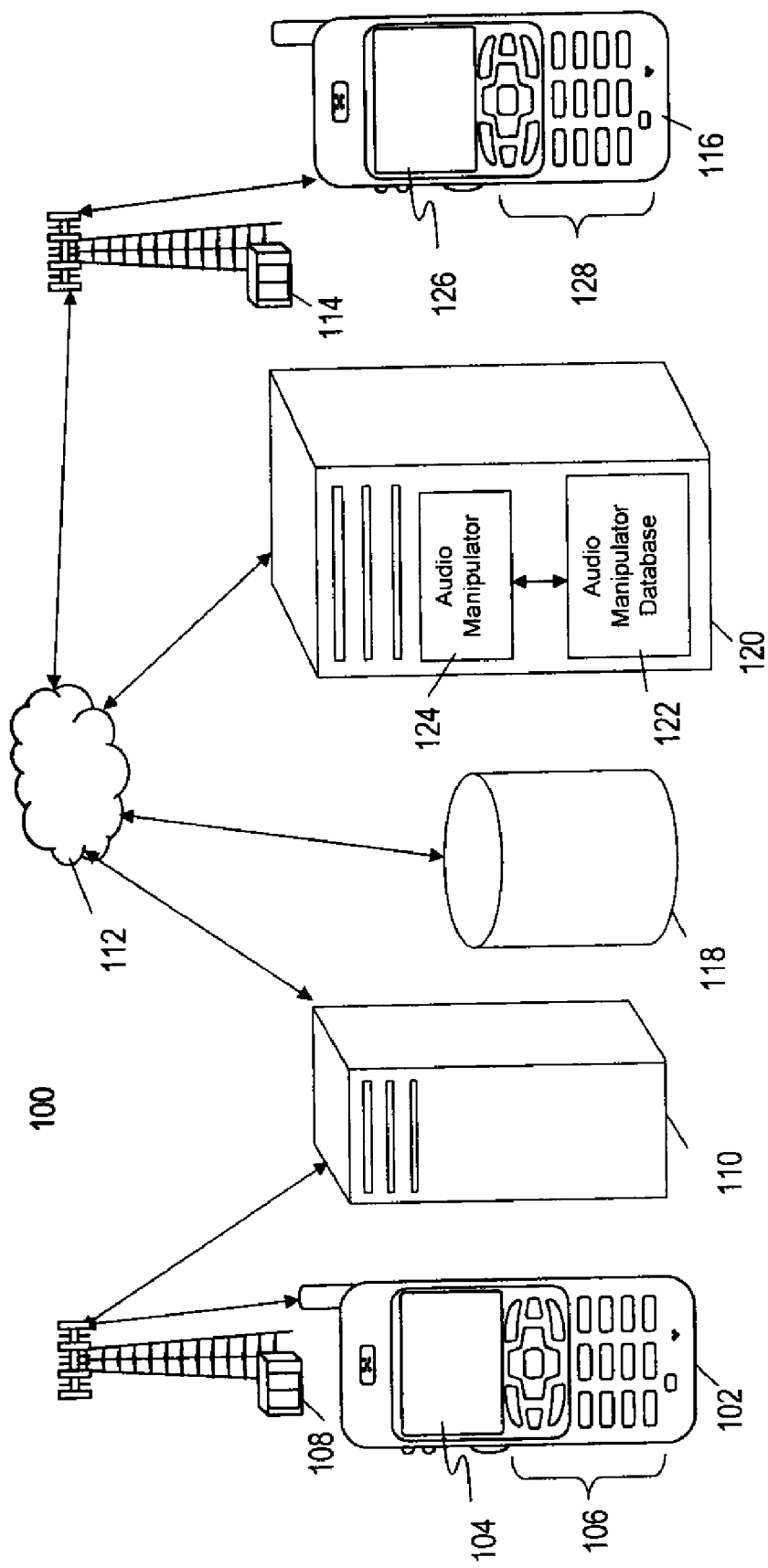
FIG. 1 shows an illustrative audio manipulation system according to some embodiments of the present disclosure.

FIG. 1 shows an illustrative system 100 for implementing audio manipulation methods according to some embodiments of the present disclosure. The system 100 is shown as including a mobile device 102, although any electronic device a user interface may be configured to carry out aspects of the methods disclosed herein. Among other things, telephones and personal digital assistants (PDAs) may be configured to carry out aspects of the disclosed audio manipulation methods. Many suitable mobile devices combine some or all of these functions. While one mobile device and one receiver are shown in FIG. 1, other mobile devices could be present.

In some embodiments, the mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may include software to configure the mobile device 102 to perform various customized functions in response to user interaction, such as making an audio manipulation selection from an audio manipulation service.

The mobile device 102 may communicate through a first cell tower 108, a gateway server 110, a wired or wireless network 112, and a second cell tower 114 to a receiver 116. The gateway server 110 may communicate with a customer registry database 118 and an audio manipulation server 120. The audio manipulation server 120 may include an audio manipulation database 122 and an audio manipulator 124. Although described as separate from the gateway server 110, functions of the audio manipulation server 120 can be incorporated in the gateway server 110. The mobile device 102 may communicate with the receiver 116 through the wired or wireless network 112 and the cell towers 108 and 114 by a standard wireless telephony protocol (such as code division multiple access) or some other means of wireless communication.

Turning now to FIG. 2, the illustrative mobile device display 104 is depicted according to some embodiments of the present disclosure. The audio manipulation server 120 communicates options for using an audio manipulation service to the mobile device 102, which offers selections to a mobile device user through the display 104, such as a "select movie character voice modulation" 204 selection, a "select television star voice modulation" 206 selection, a "select cartoon character voice modulation" 208 selection, a "select background sound filter" 210 selection, and a "select background sound addition" 212 selection. The numbers and types of selections are depicted for the purpose of an illustrative example only, as the display 104 can include any number or types of selections. Although the description of the mobile device 102 to which the display 104 applies is a mobile phone, in some embodiments the display 104 applies equally to portable computers, personal digital assistants and other telephones.

The display 104 can offer a standard menu to a mobile device user, such as a menu with standard options, such as "tools." If the mobile device user selects a standard option such as "tools," the display 104 can offer options commonly offered on mobile devices, such as "voice memo," "scheduler," "alarm clock," "memo pad," "calculator," and an additional option for "audio manipulation." After the mobile device user selects the option of "audio manipulation," the display 104 can offer the menu 202. Making the "select movie character voice modulation" 204 selection enables the audio manipulation server 120 to modulate the voice of the user of the mobile device 102 to sound like the voice of a specific movie character to the user of the receiver 116. Making the "select television star voice modulation" 206 selection enables the audio manipulation server 120 to modulate the voice of the user of the mobile device 102 to sound like the voice of a specific television star to the user of the receiver 116. Making the "select cartoon character voice modulation" 208 selection enables the audio manipulation server 120 to modulate the voice of the user of the mobile device 102 to sound like the voice of a specific cartoon character to the user of the receiver 116. Making the "select background sound addition" 210 selection enables the audio manipulation server 120 to add a selected background sound behind the voice of the user of the mobile device 102 for the user of the receiver 116.

Making the "select background sound filter" 212 selection enables the audio manipulation server 120 to filter the background sounds behind the voice of the user of the mobile device 102 for the user of the receiver 116. The audio manipulation server 120 can filter the background sounds behind the voice by using a voice recognition system that extracts the voice content from the signal and transmitting only the voice content to the receiver 116. Filtration of background sounds can prove helpful for conversation comprehension in situations when the user of the mobile device 102 is calling from a loud environment, such as an airport, a sporting event, or a party. Additionally, the user of the mobile device 102 can select the filtration of background sounds to prevent identification of the location from which the user is calling. For example, a student claiming to be calling from a library can use background sounds filtration to prevent a parent of the student from hearing background sounds that indicate that the student is calling from a party. This can be furthered by the addition of background sounds defining the desired environment, such as a library, an office, or the cantina in the original Star Wars movie.

When the user of the mobile device 102 makes an audio manipulation selection, the audio manipulation server 120 can offer a sample of the voice or the background sound generated by the audio manipulation selection to which the user can listen. The sample can be a pre-recorded sample of the selected voice or background sound. The sample can also be a trial version of the selected voice modulation whereby the user speaks into the mobile device 102 and the audio manipulation service modulates the voice of the user to enable the user to listen to their own modulated voice. Offering samples of voices and background sounds generated by audio manipulation selections can assist the user in making audio manipulation selections.

Turning now to FIG. 3, another example of the illustrative mobile device display 104 is depicted according to some embodiments of the present disclosure. After the user of the mobile device 102 makes an audio manipulation selection from the menu 202, the display 104 can offer a menu such as a menu 302 to the mobile device user. The menu 302 offers selections to the mobile device user, such as a "select recipient(s) of manipulated audio signal" 304 selection, a "select audio manipulation date and time" 306 selection, and a "customize voice modulation" 308 selection.

Selecting the "select recipient(s) of manipulated audio signal" 304 selection enables the user of the mobile device to view a sub-menu displaying entries in the mobile device phone book to select which audio manipulations are activated for which receivers. For example, the user of the mobile device 102 selects to sound like a movie character when speaking to the receiver of a parent and selects to sound like a television star when speaking to the receiver of a friend. As an additional example, the user of the mobile device 102 selects to sound like a cartoon character when speaking on any incoming call. In such a situation, the gateway server 110 determines whether an audio manipulation flag associated with the mobile device 102 is set when processing the audio signal from the mobile device 102 to the caller, and routes the audio signal to the audio manipulation server 120 if the associated audio manipulation flag is set.

Selecting the "select audio manipulation date and time" 306 selection enables the user of the mobile device to view a sub-menu displaying dates and times so the user of the mobile device can select time durations for audio manipulations, such as one day of sounding like a cartoon character for any incoming call or one week of sounding like a television star when speaking to the receiver of a friend, or disabling the audio manipulation during working hours.

Selecting the "customize voice modulation" 308 selection the enables the user of the mobile device to view a sub-menu to design a custom voice modulation. For example, the mobile device user initially selects a movie character voice modulation from the menu 202, and then selects the "customize voice modulation" 308 selection from the menu 302. Selecting the "customize voice modulation" 308 selection can result in displaying a sub-menu of second voices to select, where the sub-menu of second voices is similar to the menu 202, except for the omission of the option to choose the voice modulation already selected. Continuing the example, the mobile device user selects a cartoon character voice modulation, which combines with the initial selection of the movie character voice modulation to produce a custom voice modulation. When the mobile device user makes a call using this custom voice modulation, the audio manipulation server 120 processes the audio signal twice, once for each selected voice modulation, to manipulate the audio signal to sound like a voice that is a combination of the movie character voice and the cartoon character voice.

Turning now to FIG. 4, yet another example of the illustrative mobile device display 104 is depicted according to some embodiments of the present disclosure. After the user of the mobile device 102 chooses the option for the "select background sound addition 212" selection from the menu 202, the display 104 can offer a menu such as a menu 402 to the mobile device user. The menu 402 offers selections to the mobile device user, such as a "select office background sound" 404 selection, a "select party background sound" 406 selection, and a "select music background sound" 408 selection.

Selecting the "select office background sound" 404 selection enables the user of the receiver 116 to hear office sounds as background sounds behind the voice of the user of the mobile device 102. For example, after the user of the mobile device 102 selects the "select office background sound" 404 selection, the user of the receiver 116 hears photocopiers, fax machines, and distant office discussions as background sounds behind the voice of the user of the mobile device 102. The selected office background sounds can cause the user of the receiver to believe that the user of the mobile device 102 is calling from work.

Selecting the "select party background sound" 406 selection enables the user of the receiver 116 to hear party sounds as background sounds behind the voice of the user of the mobile device 102. For example, after the user of the mobile device 102 selects the "select party background sound" 406 selection, the user of the receiver 116 hears dance music, laughter and distant party discussions as background sounds behind the voice of the user of the mobile device 102. The selected party background sounds can cause the user of the receiver to believe that the user of the mobile device 102 is calling from a party, which can make the user of the receiver more likely to accept a party invitation from the user of the mobile device 102.

Selecting the "select music background sound" 408 selection enables the user of the receiver 116 to hear music as the background sound behind the voice of the user of the mobile device 102. Selecting the "select music background sound" 408 selection can result in displaying a sub-menu of numerous specific music selections to select, such that the user of the mobile device 102 can select appropriate music for the background sound. For example, after the user of the mobile device 102 selects the "select music background sound" 408 selection, the user of the mobile device 102 can select a favorite musical selection of the user of the receiver 116 from a sub-menu of specific music selections. These selections can result in the user of the receiver 116 hearing their favorite music behind the voice of the user of the mobile device 102. In some embodiments, background sounds can be customized by a user selecting from a palette of sounds and mixing them to taste.

Selecting from a sub-menu of specific music selections can result in displaying a sub-menu of voices to select, where the sub-menu of voices is similar to the menu 202, except for the option to use a voice modulation already selected and the option for no voice modulation at all. Continuing the example, the mobile device user selects a movie character voice modulation, which combines with the initial selection of the theme music associated with the movie character whose voice is selected to produce a combined audio manipulation. When the mobile device user makes a call using this combined audio manipulation, the audio manipulation server 120 processes the audio signal twice, once for each selected audio manipulation, to manipulate the audio signal to sound like a call that is a combination of the movie character voice with the theme music associated with the movie character as the background sound. Customization of voice modulation and/or background sounds can be accomplished in a sophisticated manner logged in from a computer or other more full-function interfaces, with the custom results stored under user defined tags more accessible using the described menu system on the mobile device 102.

Turning now to FIG. 5, the illustrative audio manipulation database 122 is depicted according to some embodiments of the present disclosure. The audio manipulation database 122 can be located separately from the audio manipulation server 120 or within the audio manipulation server 120, and includes a variety of audio manipulations for users of mobile devices to select, such as a "movie character voice modulation" 502, a "television star voice modulation" 504, and a "music background sound" 506. The audio manipulation server 120 receives an audio manipulation selection from the mobile device 102, and stores the selection in the audio manipulation database 122, which designates the selected audio manipulation for subsequent use by the mobile device 102. Upon receiving a call associated with the mobile device 102, the audio manipulation server 120 accesses the audio manipulation database 122 to identify the selected audio manipulation for the mobile device 102, which enables the audio manipulator 124 to manipulate the audio signal from the mobile device 102 based on the selected audio manipulation.

The selected network access identifiers 508 include standard identifications for identifying each user of a mobile device who requests access to a network and makes an audio manipulation selection. The network access identifiers 508 enable the audio manipulation server 120 to identify calls associated with the mobile device 102 with previously made audio manipulation selections.

Turning now to FIG. 6, the illustrative customer registry database 118 is depicted according to some embodiments of the present disclosure. The customer registry database 118 stores data that the gateway server 110 may reference, such as network access identifiers table 602, phone numbers table 604, router information table 606, and features tables which includes audio manipulation flags 608. The types of data are depicted for the purpose of an illustrative example only, as the customer registry database 118 can include many types of data.

The network access identifiers table 602 include standard identifications for identifying each user of a mobile device who requests access to a network. The network access identifiers table 602 enable the gateway server 110 to identify a network access identifier for a telephone number, to determine a route for a call, and to identify a call associated with the mobile device 102 for which an audio manipulation flag is set.

The phone numbers table 604 includes telephone numbers associated with telephones directed by the gateway server, such as the mobile device 102. The phone numbers table 604 enables the gateway server 110 to route a call specifying a called telephone number by referencing a network access identifier corresponding to the called telephone number and using the referenced network access identifier to determine how to route the call. The phone numbers table 604 also enable the gateway server 110 to determine whether a call specifying a called telephone number is associated with a mobile device for which audio manipulation is selected by referencing a network access identifier corresponding to the called telephone number and using the referenced network access identifier to reference an audio manipulation flag.

The router information table 606 includes information that identifies the cell towers closest to where calling and/or receiving mobile devices are currently located. Based on any identified cell towers, calls are routed dynamically. For example, the router information table 606 can include information that identifies the first cell tower 108 as the closest cell tower to where the receiver 116 is currently located and the second cell tower 114 as the closest cell tower to where the receiver 116 is currently located. Based on the router information table 606, the call from the mobile device 102 is dynamically routed through the first cell tower 108, the gateway server 110, the wireless or wired network 112, and the second cell tower 114 to the receiver 116.

The audio manipulation flags 608 specify whether a user of the mobile device 102 has selected to use audio manipulation for subsequent calls associated with the mobile device 102. The audio manipulation flags 608 include an audio manipulation flag corresponding to a network access identifier for each mobile device selected for audio manipulation.

Figure 7:
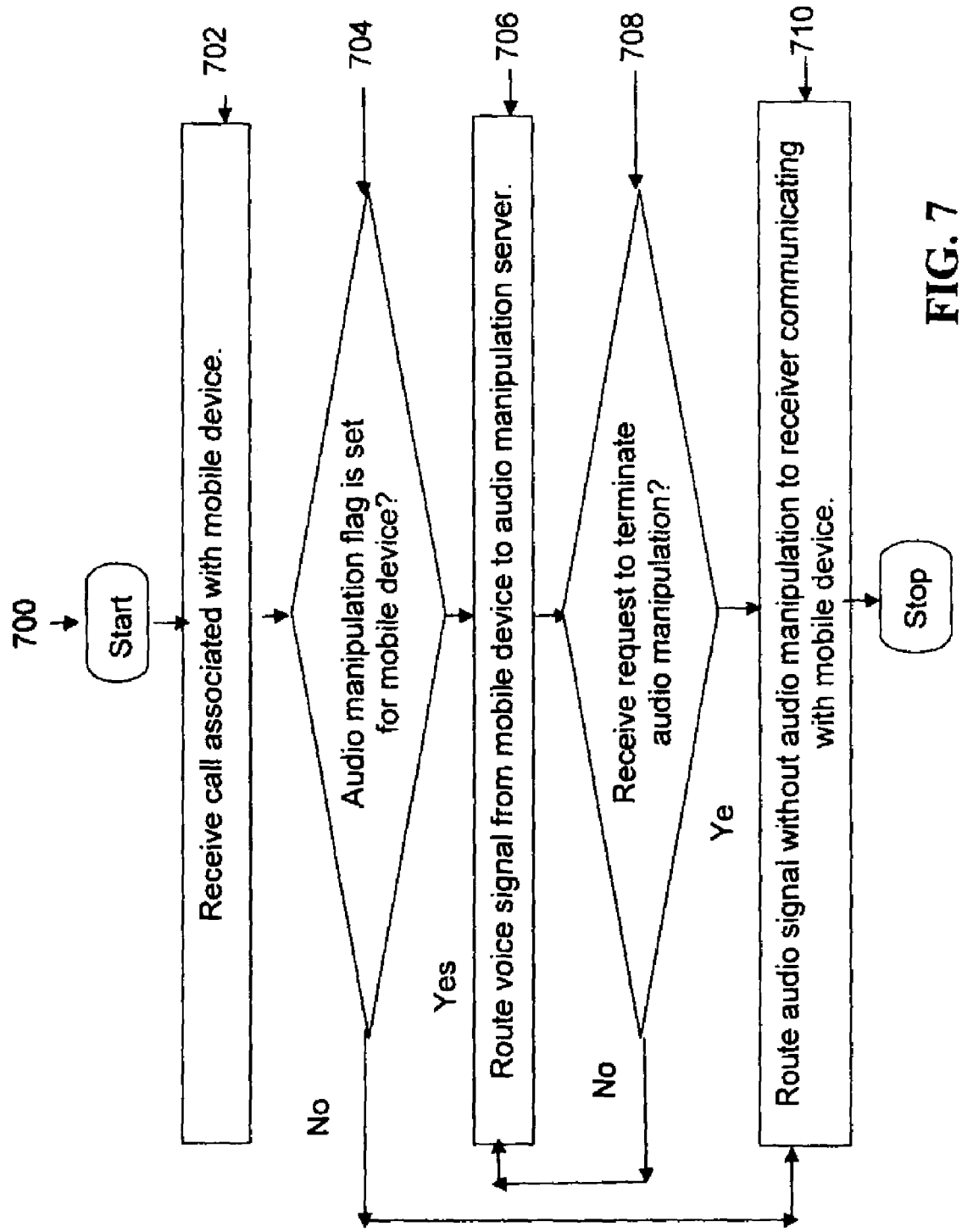
FIG. 7 shows an illustrative gateway server method according to some embodiments of the present disclosure.

Turning now to FIG. 7, an illustrative gateway server method is depicted according to some embodiments of the present disclosure. The method enables the gateway server 110 to process audio manipulation selections and to route calls for audio manipulation based upon audio manipulation selections.

In box 702, the gateway server 110 receives a call associated with the mobile device 102. For example, the user of the mobile device 102 places a call to the receiver 116.

In box 704, the gateway server 110 determines whether an audio manipulation flag is set for the mobile device 102. For example, the gateway server 110 checks the network access identifier for a received call against the network access identifiers table 606 in the customer registry database 118 to determine for which received calls the audio manipulation flags 608 are set. In another example, the gateway server 110 checks the telephone number called for a received call against the phone numbers table 602 in the customer registry database 118 to reference the network access identifiers table 606 to determine for which received calls the audio manipulation flags 608 are set. If the gateway server 110 determines that a received call is associated with the mobile device 102 for which an audio manipulation flag is set, the method continues to box 706. If the gateway server 110 determines that a received call is not associated with the mobile device 102 for which an audio manipulation flag is set, the method proceeds to box 710.

In box 706, the gateway server 110 routes an audio signal from the mobile device 102 to the audio manipulation server 120. For example, the gateway server 110 uses the router information table 604 to route each of the audio packets that are components of the audio signal from the mobile device 102 to the audio manipulation server 120. The audio manipulation server 120 uses a previously made audio manipulation selection to manipulate the audio signal and uses the router information table 604 to route the audio signal to its specified destination, the receiver 116.

In box 708, the gateway server 110 determines whether it receives a request to terminate audio manipulation for a call associated with the mobile device 102. The request to terminate audio manipulation for the call can be made by resetting the audio manipulation flag associated with the mobile device 102. If the gateway server 110 determines that it receives a request to terminate audio manipulation for the call associated with the mobile device 102, the method continues to box 710 to terminate audio manipulation for the call. If the gateway server 110 determines that it does not receive a request to terminate audio manipulation for the call associated with the mobile device 102, the method returns to box 706 to continue audio manipulation for the call.

For example, the gateway server 110 receives a request from the mobile device 102 to terminate audio manipulation for the call associated with the mobile device 102. In some embodiments, the display 104 presents an option that the user of the mobile device 102 can select using the keys 106 to request termination of audio manipulation during the call associated with the mobile device 102. In some embodiments, the user of the mobile device 102 can select a pre-determined key of the keys 106 to request termination of audio manipulation during the call associated with the mobile device 102. The request from the mobile device 102 to terminate audio manipulation during the call can be made by resetting the audio manipulation flag associated with the mobile device 102.

In some embodiments, the gateway server 110 receives a request from the receiver 116 to terminate audio manipulation for the call associated with the mobile device 102. For example, receivers for government authorities, emergency call centers, fire stations, and police dispatchers are enabled to terminate audio manipulation. In another example, parents paying for their family subscription to an audio manipulation service are enabled to request termination of audio manipulation for calls received from the mobile devices of their children. In some embodiments, the display 126 presents an option that the user of the receiver 116 can select using the keys 128 to request termination of audio manipulation during the call associated with the mobile device 102. In some embodiments, the user of the receiver 116 can select a predetermined key of the keys 128 to request termination of audio manipulation during the call associated with the mobile device 102. The request from the receiver 116 to terminate audio manipulation during the call can be made by resetting the audio manipulation flag associated with the mobile device 102.

If the gateway server 110 does not receive a request to terminate audio manipulation for the call associated with the mobile device 102, audio manipulation can continue for the current call associated with the mobile device 102. In some embodiments, the user of the mobile device 102 makes an audio manipulation selection that is activated for calls associated with the mobile device 102 for a specified period of time, such as a one month subscription to an audio manipulation service. The audio manipulation service can bill the user of the mobile device 102 based on the one month subscription, the number of minutes when the audio manipulation service was activated for the user, or on a set price for each audio manipulation call. The subscription plan may include higher levels of service for an increased price, such as an even greater number of audio manipulation selections or the option of custom audio manipulations. Various subscriptions plans or unit pricings such as those used for ring tones, music, or games may be employed as would be understood by one of skill in the art.

In box 710, gateway server 110 routes the audio signal without audio manipulation to the receiver 116 communicating with the mobile device 102. For example, the gateway server 110 routes each of the audio packets that are components of the audio signal from the mobile device 102 through the wireless or wired network 112, and the second cell tower 114 to the receiver 116, bypassing the audio manipulation server 120.

Figure 8:
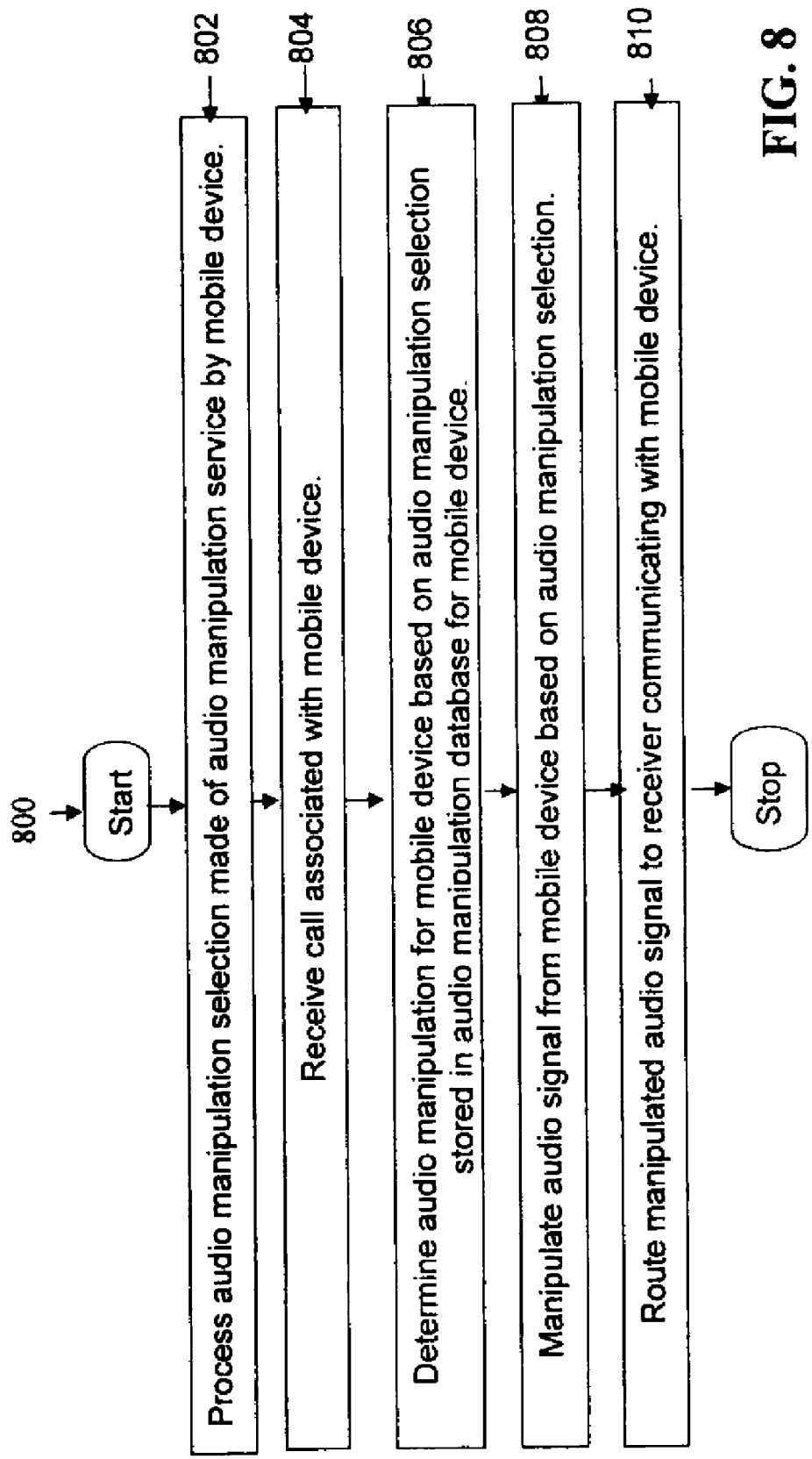
FIG. 8 shows an illustrative audio manipulation server method according to some embodiments of the present disclosure.

Turning now to FIG. 8, an illustrative audio manipulation server method is depicted according to some embodiments of the present disclosure. The method enables the audio manipulation server 120 to process audio manipulation selections, to manipulate audio signals, and to route manipulated audio signals to their destination.

In box 802, the audio manipulation server 120 processes an audio manipulation selection made of an audio manipulation service by the mobile device 102. For example, the user of the mobile device 102 executes an audio manipulation service application on the mobile device and makes an audio manipulation selection of the audio manipulation service application on the mobile device 102. The mobile device 102 sends the audio manipulation selection through the first cell tower 108 to the gateway server 110, which communicates data to the customer registry data base 118 and the audio manipulation server 120. The data communicated to the customer registry data base 118 includes a network access identifier and an audio manipulation flag for the mobile device 102. The customer registry database 118 stores an audio manipulation flag in the audio manipulation flags 608 corresponding to the network access identifier for the mobile device 102.

The audio manipulation server 120 receives data that includes an audio manipulation selection made of an audio manipulation service by the mobile device 102 and the network access identifier for the mobile device 102. The audio manipulation server 120 conveys the audio manipulation selection and the network access identifier to the audio manipulation database 122. Conveying the data to the audio manipulation database 122 results in the selection of an audio manipulation, such as the movie character voice modulation 502 depicted in FIG. 5, corresponding to the network access identifier of the mobile device 102.

In box 804, the audio manipulation server 120 receives a call associated with the mobile device 102. For example, based on the audio manipulation flag set for the network access identifier of the mobile device 102, the gateway server 110 routes a call from the mobile device 102 to the audio manipulation server 120.

In box 806, the audio manipulation server 120 determines an audio manipulation for the mobile device 102 based on the audio manipulation selection and the network access identifier stored in the audio manipulation database 122 for the mobile device 102. For example, the audio manipulation server 120 uses the network access identifier for the call from the mobile device 102 to reference the audio manipulation selection in the audio manipulation database 122 corresponding to the network access identifier stored in the audio manipulation database 122.

In box 808, the audio manipulation server 120 manipulates the audio signal from the mobile device 102 based on the audio manipulation selection. For example, the audio manipulation server 120 manipulates each of the audio packets that are components of the audio signal from the mobile device 102, based on the audio manipulation specified in the audio manipulation database 122 by the audio manipulation selection.

In box 810, the audio manipulation server 120 routes the manipulated audio signal to the receiver 116 communicating with the mobile device 102. For example, the audio manipulation server 120 routes the manipulated audio signal through the wireless or wired network 112, and the second cell tower 114 to the receiver 116.

Figure 9:
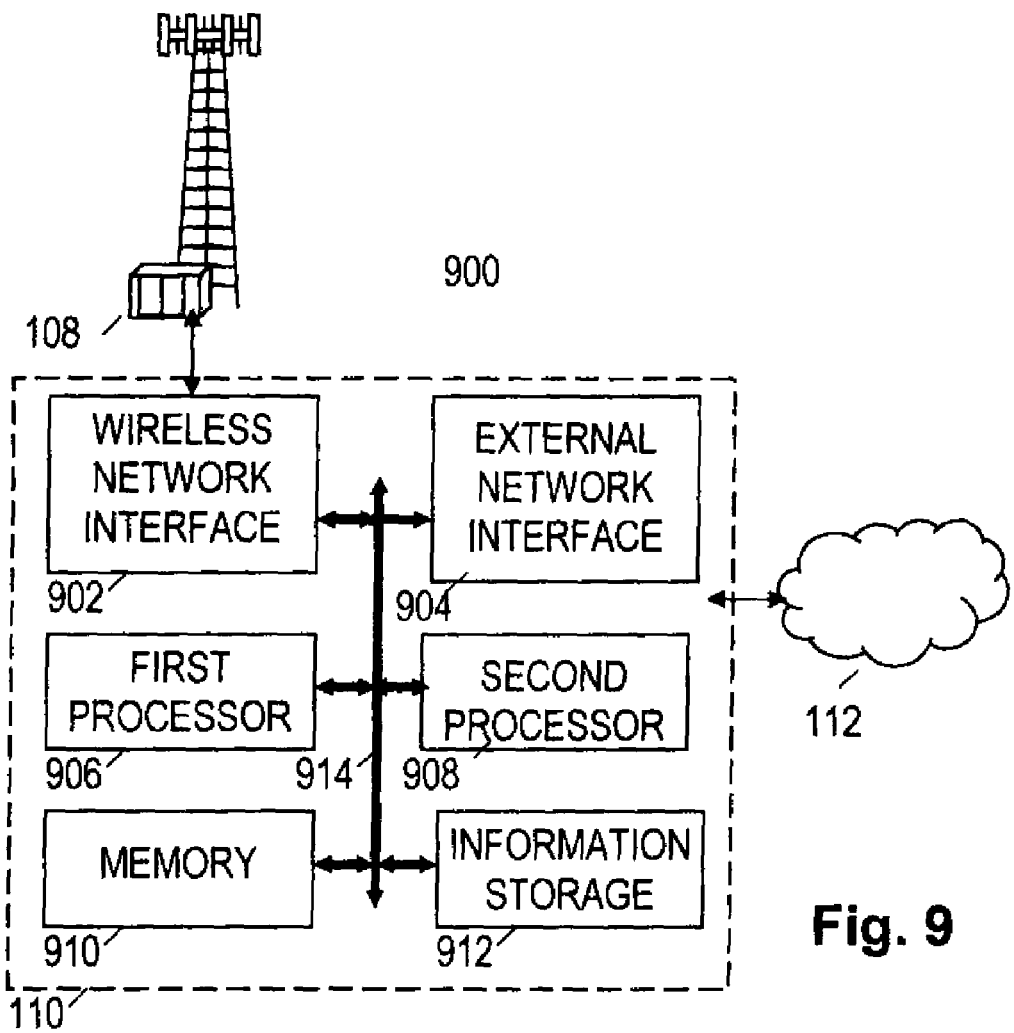
FIG. 9 shows a block diagram of an illustrative gateway server according to some embodiments of the present disclosure.

FIG. 9 shows a simplified functional block diagram 900 of the gateway server 110 according to some embodiments of the present disclosure. The gateway server 110 may comprise a wireless network interface 902, an external network interface 904, a first processor 906, a second processor 908, a memory 910, an information storage device 912, and a bus 914. While two processors are shown in FIG. 9, the gateway server 110 can include other processors as well. The gateway server 110 may be a bus-based computer, with the bus 914 interconnecting the other elements and carrying communications between them.

The wireless network interface 902 enables the first processor 906 and the second processor 908 to communicate with wireless network systems, such as the first cell tower 108. The external network interface 904 enables the first processor 906 and the second processor 908 to communicate with remote systems via the wired or wireless network 112.

The first processor 906 and the second processor 908 gather information from other system elements, including input data from the first cell tower 108, and program instructions and other data from the memory 910, the information storage device 912, or from a remote location via the external network interface 904. The first processor 906 and the second processor 908 carry out the program instructions and process the data accordingly. The program instructions may further configure the first processor 906 and the second processor 908 to send data to other system elements, data such as an audio manipulation selection.

The memory 910 may serve as a low-latency temporary store of information for the first processor 906 and the second processor 908, and the information storage device 912 may serve as a long term (but higher latency) store of information, including information such as an audio manipulation selection.

The first processor 906 and the second processor 908, and hence the gateway server 110 as a whole, operates in accordance with one or more programs stored on the information storage device 912. The first processor 906 and the second processor 908 may copy portions of the programs into the memory 910 for faster access, and may switch between programs or carry out additional programs in response to user actuation of the mobile device 102, programs such as audio manipulation selection software. The additional programs may be retrieved from the information storage device 912 or may be retrieved from remote locations via the external network interface 904. One or more of these programs configures the gateway server 110 to execute the audio manipulation selection software to carry out at least one of the audio manipulation methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. An audio manipulation method, comprising:
   receiving a call associated with a mobile device;
   determining whether an audio manipulation flag is set for the mobile device;
   routing the call to an audio manipulation server in response to a determination that the audio manipulation flag is set for the mobile device;
   bypassing the audio manipulation server and routing the call without audio manipulation to a receiver communicating with the mobile device in response to a determination that the audio manipulation flag is not set for the mobile device;
   manipulating an audio signal of the call received from the mobile device by the audio manipulation server based on an audio manipulation selection made on the mobile device in response to the determination that the audio manipulation flag is set for the mobile device; and
   routing the manipulated audio signal to the receiver communicating with the mobile device.

2. The method of claim 1 further comprising terminating the manipulation of the audio signal in response to a request received from at least one of the mobile device and the receiver.

3. The method of claim 1 wherein the audio manipulation flag is set for one of a specified period of time and a specified receiver.

4. The method of claim 1 further comprising offering a sample of a voice generated by a voice modulation to assist a mobile device user to make the audio manipulation selection that sets the audio manipulation flag.

5. The method of claim 1 further comprising enabling a mobile device user to design a custom audio manipulation, wherein the custom audio manipulation is a combination of a plurality of predefined audio manipulation selections.

6. The method of claim 1 wherein manipulating the audio signal comprises at least one of filtering background sounds and adding background sounds.

7. The audio manipulation method of claim 1, wherein the audio manipulation flag is set in a network access identifier table.

8. An audio manipulation system, comprising:
   a gateway server configured to receive a call associated with a mobile device and to determine whether an audio manipulation flag is set for the mobile device, responsive to a determination that the audio manipulation flag is set for the mobile device the gateway server is further configured to route the call to an audio manipulation server, and responsive to a determination that the audio manipulation flag is not set for the mobile device the gateway server is further configured to bypass the audio manipulation server and route the call without audio manipulation to a receiver communicating with the mobile device; and
   the audio manipulation server configured to manipulate an audio signal of the call received from the gateway server based on an audio manipulation selection made on the mobile device and to route the manipulated audio signal to the receiver communicating with the mobile device.

9. The system of claim 8 wherein the audio manipulation server is further operable to terminate the manipulation of the audio signal in response to a request received from at least one of the mobile device and the receiver.

10. The system of claim 8 wherein the audio manipulation flag is set for one of a specified period of time and a specified receiver.

11. The system of claim 8 wherein the audio manipulation server is further operable to offer a sample of a voice generated by a voice modulation to assist a mobile device user to make the audio manipulation selection that sets the audio manipulation flag.

12. The system of claim 8 wherein the audio manipulation server is further operable to enable a mobile device user to design a custom audio manipulation.

13. The system of claim 8 wherein the audio manipulation server is further operable to enable a mobile device user to at least one of filter background sounds and add background sounds.

14. An audio manipulation method, comprising:
   executing an audio manipulation service application on a mobile device;
   receiving an audio manipulation selection the audio manipulation service application on the mobile device to set an audio manipulation flag;
   making a call from the mobile device to a receiver;
   communicating from the mobile device with the receiver through an audio manipulation server using a manipulated audio signal generated by the audio manipulation server by a manipulation of an audio signal of the call based on the audio manipulation selection while the audio manipulation flag is set; and
   communication from the mobile device with the receiver without audio manipulation of the call by bypassing the audio manipulation server while the audio manipulation flag is not set.

15. The method of claim 14 further comprising terminating manipulation of the manipulated audio signal in response to a request from the mobile device.

16. The method of claim 14 wherein the audio manipulation flag is set for a specified period of time.

17. The method of claim 14 wherein the audio manipulation flag is set for a specified receiver.

18. The method of claim 14 further comprising offering a sample of a voice generated by a voice modulation from an audio manipulation service to assist a mobile device user to make the audio manipulation selection to set the audio manipulation flag.

19. The method of claim 14 further comprising enabling a mobile device user to design a custom audio manipulation.

20. The audio manipulation method of claim 14, wherein the audio manipulation selection is an audio manipulation type selection that includes one of a voice modulation, a background sound filtering, and a background sound addition.

* * * * *